United States Patent
Kimura

(10) Patent No.: US 8,009,926 B2
(45) Date of Patent: Aug. 30, 2011

(54) IMAGE PROCESSING APPARATUS, IMAGE PROCESSING METHOD, AND MEDIUM STORING PROGRAM

(75) Inventor: Shunichi Kimura, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1132 days.

(21) Appl. No.: 11/730,311

(22) Filed: Mar. 30, 2007

(65) Prior Publication Data

US 2007/0230806 A1   Oct. 4, 2007

(30) Foreign Application Priority Data

Apr. 3, 2006   (JP) ................. 2006-102026

(51) Int. Cl.
*G06K 9/40* (2006.01)
*G06K 9/36* (2006.01)
*H04N 1/60* (2006.01)
*G09G 5/00* (2006.01)

(52) U.S. Cl. .......... 382/254; 382/232; 358/1.9; 345/619

(58) Field of Classification Search .............. 382/254, 382/232, 282, 286, 291, 305; 345/619, 705, 345/716, 781, 790, 530; 707/3, 7, 102, 706, 707/707; 709/219; 358/1.9
See application file for complete search history.

(56) References Cited

U.S. PATENT DOCUMENTS

| | | | |
|---|---|---|---|
| 5,995,660 A | 11/1999 | Andoh et al. | |
| 6,404,921 B1 | 6/2002 | Ishida | |
| 6,691,130 B2 * | 2/2004 | Kawasaki et al. | 1/1 |
| 6,813,395 B1 * | 11/2004 | Kinjo | 382/305 |
| 6,853,389 B1 * | 2/2005 | Ikeda | 715/790 |
| 7,233,708 B2 * | 6/2007 | Li et al. | 382/305 |
| 2001/0020949 A1 | 9/2001 | Gong et al. | |
| 2005/0270549 A1 * | 12/2005 | Zhou et al. | 358/1.13 |

FOREIGN PATENT DOCUMENTS

| | | |
|---|---|---|
| JP | 2-254574 | 10/1990 |
| JP | 2-273878 | 11/1990 |
| JP | 04-157578 | 5/1992 |
| JP | 10-070654 | 3/1998 |
| JP | 10-229497 | 8/1998 |
| JP | 2001-43363 | 2/2001 |
| JP | 2001-238074 | 8/2001 |
| JP | 2002-271633 | 9/2002 |
| JP | 2003-085556 | 3/2003 |
| JP | 2004-186934 | 7/2004 |

* cited by examiner

*Primary Examiner* — Kanji Patel
(74) *Attorney, Agent, or Firm* — Morgan, Lewis & Bockius LLP

(57) ABSTRACT

An image processing apparatus includes: an area setting section that sets a searching area of a predetermined size in inputted image data; a searching section that searches for pixels having a predetermined pixel value in the searching area set by the area setting section; an attribute determining section that determines attribute of pixels contained in the searching area on the basis of at least one of a number and an arrangement of the pixels searched for by the searching section; and an attribute assigning section that assigns the attribute determined by the attribute determining section to the searched pixels.

10 Claims, 10 Drawing Sheets

IMAGE PROCESSING PROGRAM 5

RELATIONSHIP BETWEEN TARGET PIXEL AND PIXEL GROUP

REFERENCE RANGE USED WHEN 3 x 3 OR GREATER SIZE IS TO BE SEARCHED FOR (WHEN 2 x 2 OR SMALLER SIZE IS TO BE SEARCHED FOR)

WHEN AN ATTRIBUTE IS TO BE ASSIGNED FOR EACH
TARGET PIXEL

WHEN AN ATTRIBUTE IS TO BE ASSIGNED FOR EACH
PIXEL GROUP

WHEN PIXEL GROUP OF THREE OR MORE ROWS OR THREE OR MORE COLUMNS IS TO BE SEARCHED FOR

WHEN PIXEL GROUP OF FOUR OR MORE ROWS OR
FOUR OR MORE COLUMNS IS TO BE SEARCHED FOR

IMAGE PROCESSING APPARATUS 2

US 8,009,926 B2

IMAGE PROCESSING APPARATUS, IMAGE PROCESSING METHOD, AND MEDIUM STORING PROGRAM

CROSS-REFERENCE TO RELATED APPLICATIONS

This application is based on and claims priority under 35 USC 119 from Japanese Patent Application No. 2006-102026 filed Apr. 3, 2006.

BACKGROUND

Technical Field

The present invention relates to an image processing apparatus which performs image processing matched with the attributes of images, an image processing method, a medium storing a program and a computer data signal.

SUMMARY

According to an aspect of the invention, an image processing apparatus includes an area setting section that sets a searching area of a predetermined size in inputted image data; a searching section that searches for pixels having a predetermined pixel value in the searching area set by the area setting section; an attribute determining section that determines attribute of pixels contained in the searching area on the basis of at least one of a number and an arrangement of the pixels searched for by the searching section; and an attribute assigning section that assigns the attribute determined by the attribute determining section to the searched pixels.

BRIEF DESCRIPTION OF THE DRAWINGS

Exemplary embodiments of the present invention will be described in detail based on the following figures, wherein.

DETAILED DESCRIPTION

First, to facilitate understanding of the present invention, its background and outline will be described.

For instance, there is a method by which image parts for lossy encoding (such as graphic pattern parts, photographic parts or the like) and image parts for lossless encoding (such as character parts or line drawing parts) are separated from each other, and subjected to encoding for each.

In this separation of images, an input bit map image is split into blocks of a predetermined size, blocks in which pixels of the same pixel value (the same color) frequently appear are determined to be character/line drawing parts, and blocks in which the colors of adjoining pixels frequently differ are determined to be graphic pattern/photograph parts.

Since character/line drawing parts and graphic pattern/photograph parts are distinguished in this way from each other block by block, each of a predetermined size, by this method, a problem occurs where characters/line drawings and graphic patterns/photographs coexist in the same block. For instance, where the picture quality of such blended blocks is to be enhanced, the blocks have to be reversibly encoded to avoid deterioration of characters/line drawings by lossy encoding. In this case, the compression ratio of the blended blocks cannot be raised. Conversely, when the compression ratio of the blended blocks is to be raised, the picture quality of character/line drawing parts deteriorates. It is therefore difficult to subject blended blocks to appropriate image processing.

Then, it is conceivable to address the problem of blended blocks by determining attributes (for instance distinguishing between a character/line drawing part and a graphic pattern/photograph part) pixel by pixel.

FIG. 1 illustrate a method of determining that a target pixel is a pixel of a character/line drawing part when it is contained in a pixel group of a 3×3 or greater size. Incidentally, though the following description will refer to a case in which the input image is a black-and-white binary format image as a specific example, it also applies to fine gray scale images.

Figure 1A:
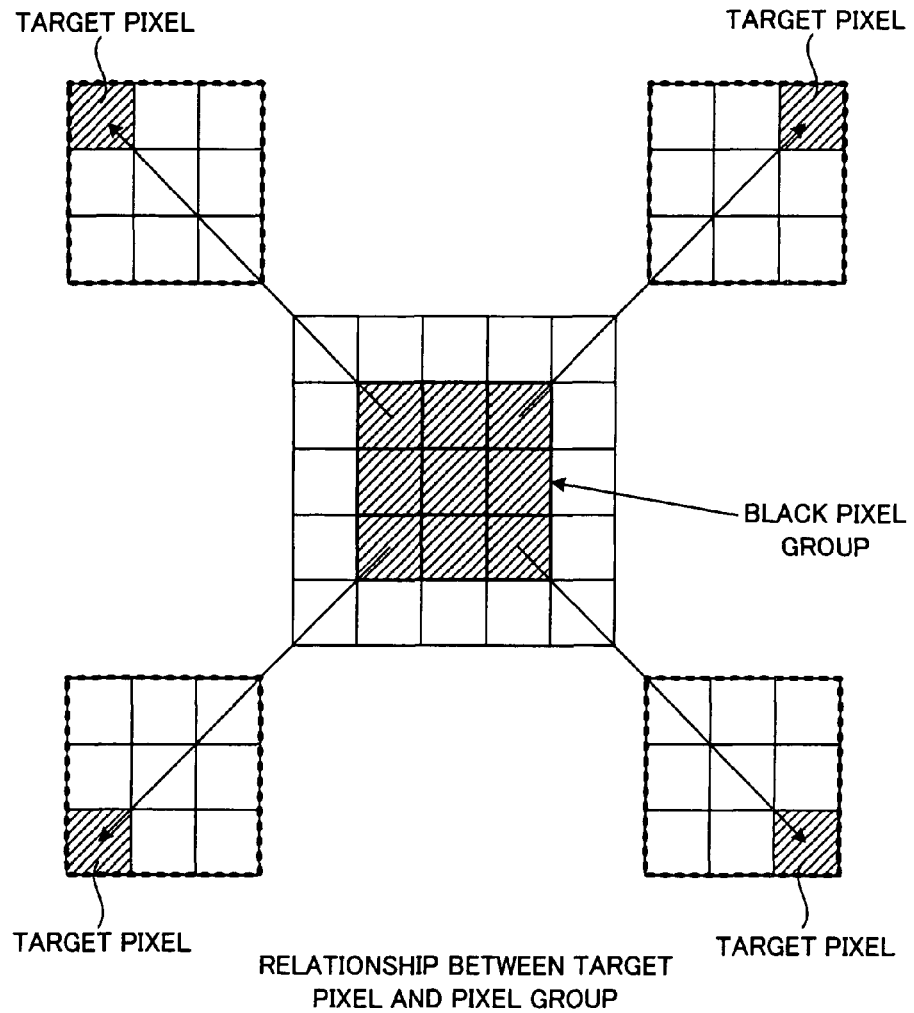
FIGS. 1A and 1B illustrate a method of determining that a target pixel is a pixel of a character/line drawing part when it is contained in a pixel group of a 3×3 or greater size.

When the target pixel is in the upper left corner of a 3×3 black pixel group as shown in FIG. 1A, determining that this target pixel is contained in the 3×3 black pixel group requires reference to at least two pixels each rightward and downward in the graph from the target pixel to find out whether or not these pixels are blotted out in the same pixel value as the target pixel.

Similarly, when the target pixel is in the upper right corner of a 3×3 black pixel group, at least two pixels each leftward and downward in the graph from the target pixel need reference; when the target pixel is in the lower left corner of a 3×3 black pixel group, at least two pixels each rightward and upward in the graph from the target pixel need reference; and when the target pixel is in the lower right corner of a 3×3 black pixel group, at least two pixels each leftward and upward in the graph from the target pixel need reference.

Figure 1B:
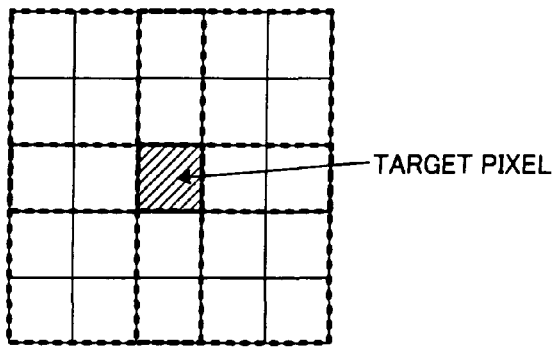

Therefore, when the position of the target pixel in the 3×3 black pixel group is unknown, an image area of a 5×5 size around the target pixel should be referenced as shown in FIG. 1B.

The reference range described with reference to FIGS. 1A and 1B will now be described in terms of pixels arranged one-dimensionally by way of example.

Figure 2A:
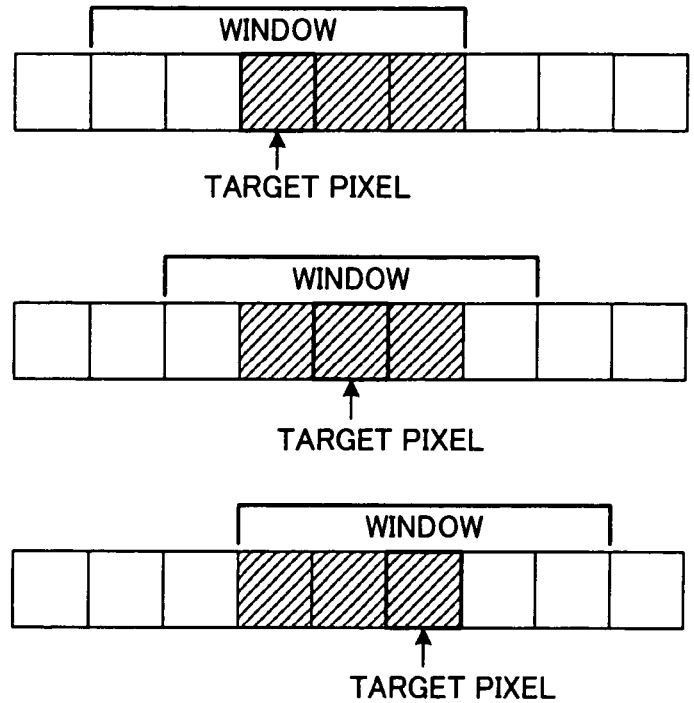
FIG. 2A shows a case in which an attribute is determined and assigned to each target pixel as in FIGS. 1A and 1B.
Figure 2B:
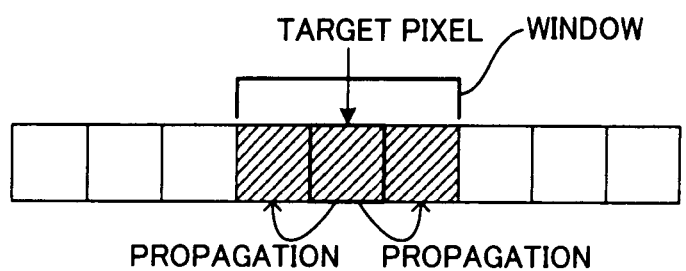
FIG. 2B shows a case in which an attribute is determined and assigned to each pixel group.

FIG. 2A shows a case in which an attribute is determined and assigned to each target pixel as in FIGS. 1A and 1B, while FIG. 2B shows a case in which an attribute is determined and assigned to each pixel group.

Here is considered a case in which, as shown in FIG. 2A, it is checked whether or not the target pixel is one of three consecutive black pixels (a black pixel group) and, if it is, an attribute value to that effect (e.g. an output value of 1) is assigned to this target pixel or, if it is not, an attribute value to that effect (e.g. an output value of 0) is assigned to this target pixel.

As shown in FIG. 2A, when each target pixel is to be checked as to whether it is part of a black pixel group while the target pixel position is being shifted in the scanning direction, a reference range (window) of 5×5 pixels around the target pixel is required. The reason is that, when the target pixel is at the left end of the black pixel group (the top level in FIG. 2A), it is necessary to confirm that the two pixels to the right of the target pixel are black pixels or, when the target pixel is at the right end of the black pixel group (the bottom level in FIG. 2A), it is necessary to confirm that the two pixels to the left of the target pixel are black pixels. To put it in general terms, when it is to be checked whether or not the target pixel belongs to a group of n pixels, a window of (2n−1) pixels is required.

Attribute determination and attribute assignment in this way require enlarging of the window size and, in turn, the memory size for holding the pixel values in the window.

An image processing apparatus 2 in this exemplary embodiment of the invention determines whether or not each individual pixel is contained in the black pixel group as shown in FIG. 2B. If it is determined that a target pixel is contained in the black pixel group, the image processing apparatus 2 assigns, to the black pixels consecutive from this target pixel, an attribute to the effect that they are contained in the black pixel group. Thus, when any pixel has been determined as being contained in a pixel group having a predetermined attribute, this attribute is assigned to the group of consecutive pixels having the same pixel value beginning with this pixel.

Since assignment of an attribute in pixel group units in this way does not requires determinations of the attribute of all pixels contained in the pixel group, the minimum necessary window size (namely the window size allowing determination of the attribute by at least one pixel in the pixel group) would suffice. More specifically, even if the window size is equivalent to three pixels, when the target pixel is in the central position of the black pixel group as shown in FIG. 2B, it is possible to determine that this target pixel is contained in the black pixel group, and this determination result (attribute) can be assigned (propagated) to the adjacent black pixels on both sides.

Figure 3A:
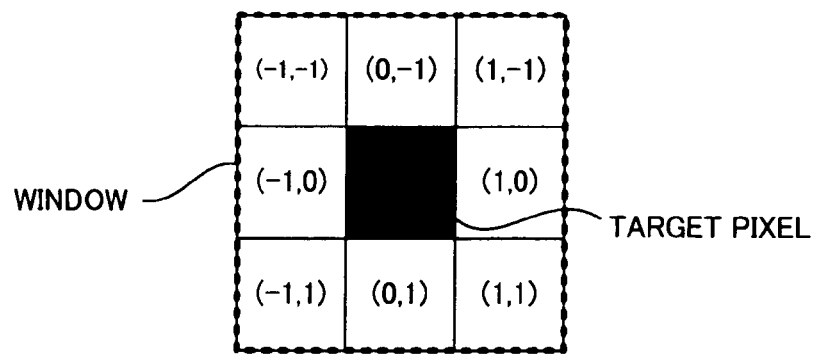
FIGS. 3A to 3D show a window for detecting a pixel group of three or more consecutive rows or three or more consecutive columns.

Next, the positional relationship between the window and the target pixel will be described. If attribute determination is possible, the position of the target pixel in the window can be set as desired. However, in order to minimize the window size, the target pixel in the central position of window (reference range) may be set as shown in FIG. 3A. Incidentally, "(m, n)" (m and n are integers) in FIG. 3A represent the position of the pixel with reference to the central position (0, 0) of a 3×3 size window.

Figure 3B:
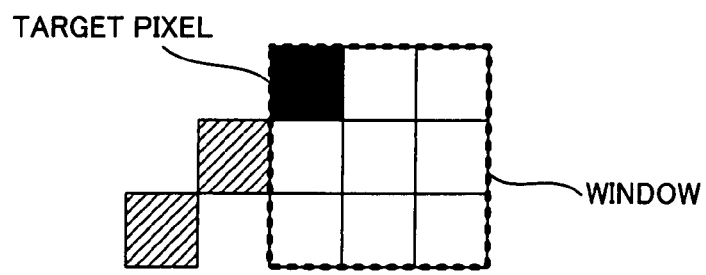

Supposing that the pixel in the position (−1, −1) is the target pixel, it will be impossible to detect a black pixel group arranged in an oblique direction as shown in FIG. 3B.

Figure 3C:
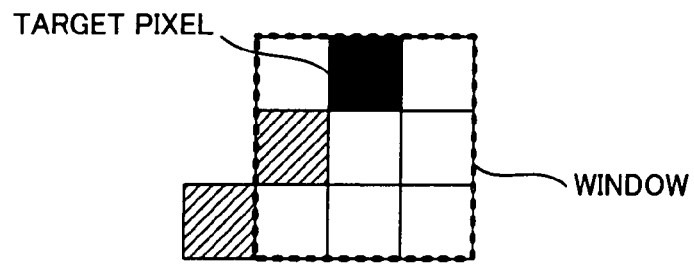

Similarly, if the pixel in the position (0, −1) is the target pixel, it will be impossible to detect a black pixel group arranged in an oblique direction as shown in FIG. 3C.

And because of the symmetry of rotation, if the target pixel is set elsewhere than the central position (0, 0) of the window, there will be an undetectable black pixel group or groups.

Figure 3D:
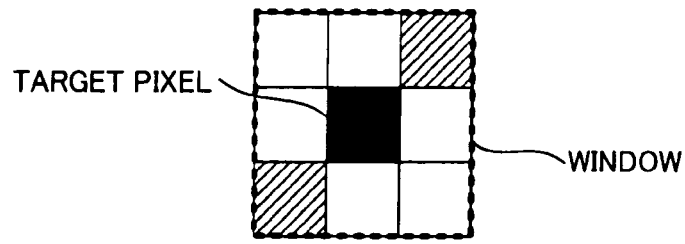

In view of this problem, this image processing apparatus 2 can detect the black pixel group in the oblique direction as shown in FIG. 3D by setting the target pixel in the central position (0, 0) of the window.

Figure 4A:
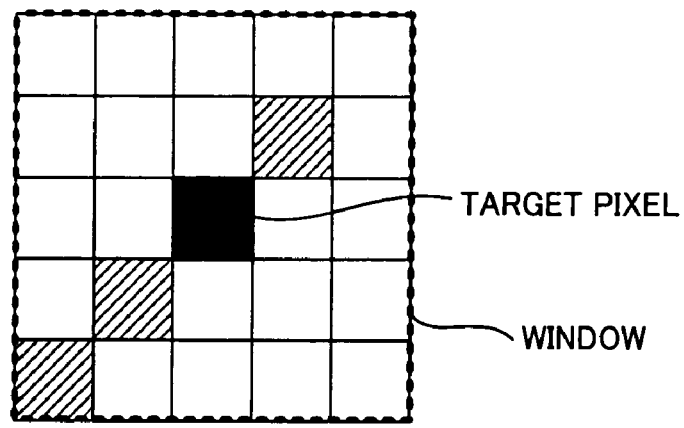
FIGS. 4A and 4B show a window for detecting a pixel group of four or more consecutive rows or four or more consecutive columns.
Figure 4B:
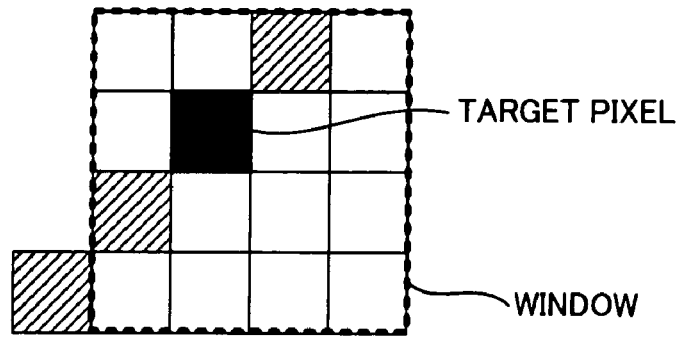

When it is desired to detect a black pixel group of four or more consecutive rows or one of four or more consecutive columns, a 5×5 size window is used as shown in FIG. 4A, because by use of a 4×4 size window, no black pixel group arranged in an oblique direction as shown in FIG. 4B can be detected.

Therefore, this image processing apparatus 2, where a black pixel group of n or more consecutive rows or n or more consecutive columns is to be detected, uses an (n+1)×(n+1) size window if n is an even number or an n×n size window if n is an odd number. Incidentally, whether n is an odd number or an even number, the target pixel in the central position in the window may be set.

First Exemplary Embodiment

Next, the hardware configuration of the image processing apparatus 2 of this exemplary embodiment will be described.

Figure 5:
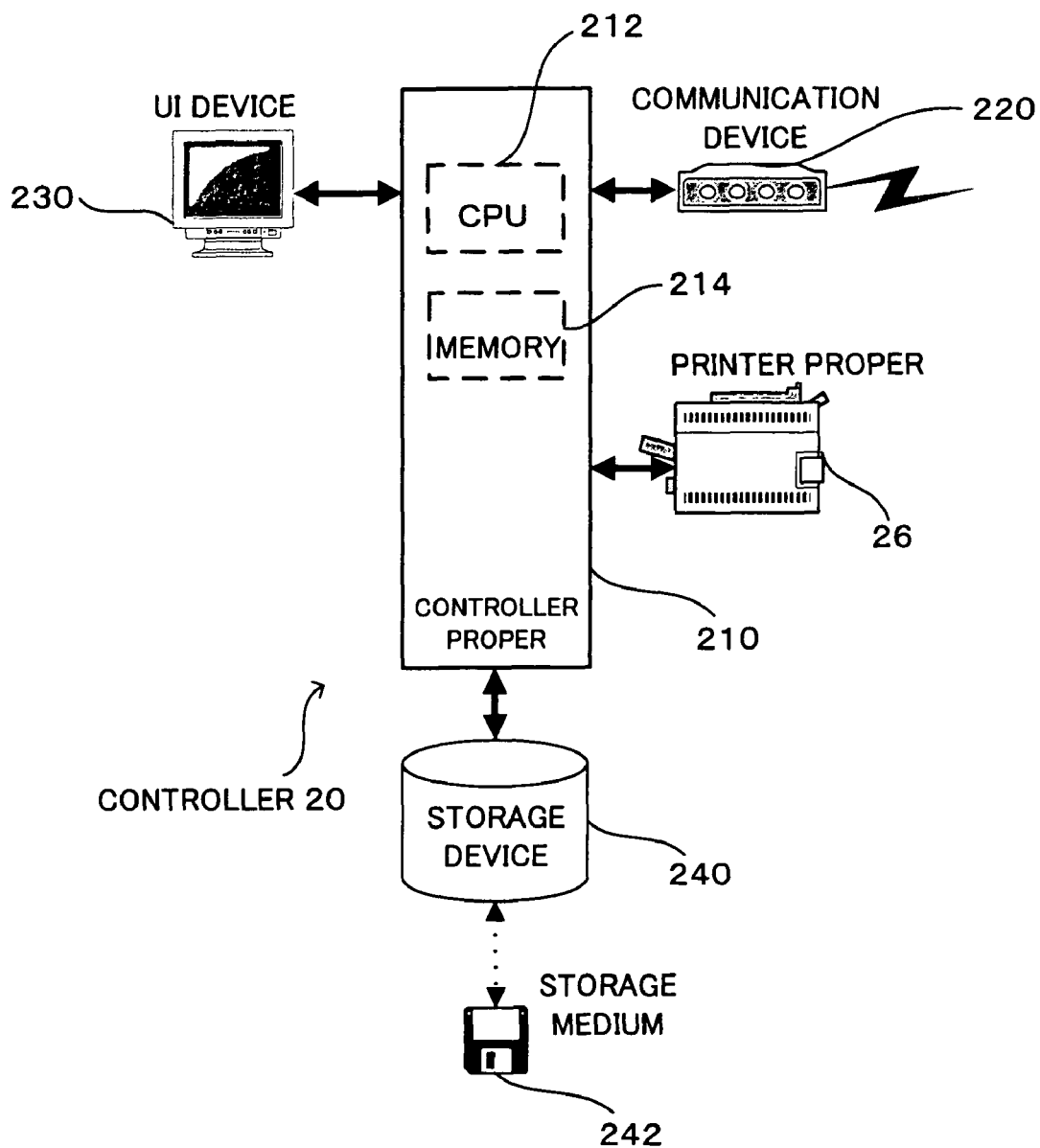
FIG. 5 shows the hardware configuration of the image processing apparatus 2 to which the image processing method is adapted with focus on a controller 20.

FIG. 5 shows the hardware configuration of the image processing apparatus 2 to which the image processing method is adapted with focus on a controller 20.

As shown in FIG. 5, the image processing apparatus 2 includes the controller 20 containing a CPU 212 and a memory 214 among other elements, a communication device 220, a storage device 240 such as an HDD/CD device and a user interface (UI) 230 including an LCD display or CRT display, a keyboard, a touch panel and the like.

The image processing apparatus 2, disposed within a printer 26 for instance, acquires data via the communication device 220 or the storage device 240, and encodes the acquired image data by the MRC system.

Figure 6A:
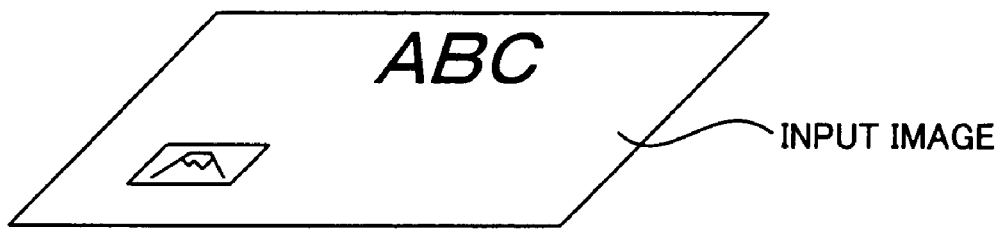
FIGS. 6A and 6B illustrate encoding by the MRC system.
Figure 6B:
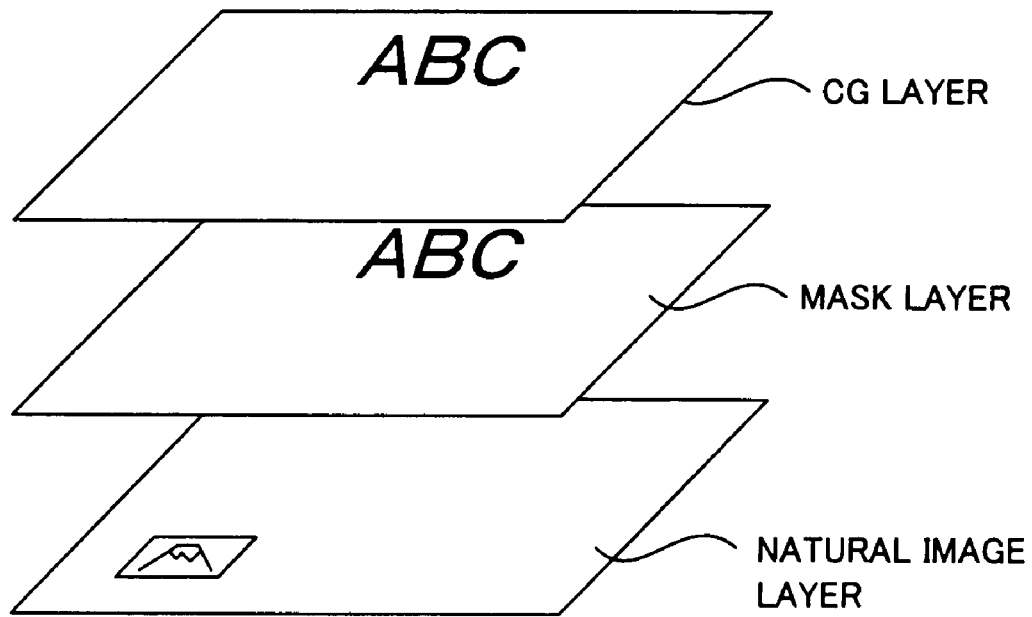

FIGS. 6A and 6B illustrate encoding by the MRC system.

As illustrated in FIG. 6A an optically picked-up image element (such as a photographic image) and a computer-generated image element (such as a font image or a computer graphic image) may coexist in an input image. Since the variations of pixel values are continuous in optically picked-up image elements (hereinafter referred to as natural images), they better fit lossy encoding systems such as JPEG. On the other hand, as computer-generated image elements (hereinafter referred to as CG images) vary little in pixel value, they better fit lossless encoding systems such as LZ.

Accordingly this image processing apparatus 2 allocates, out of inputted image data (FIG. 6A), image elements of a CG image to the CG layer to which a lossless encoding system is applied and image elements of a natural image to the natural image layer to which an lossy encoding system is applied as illustrated in FIG. 6B. Incidentally, the mask layer is a binary format image in which mask bits ("1" or "0") to instruct whether pixel values of the CG layer or those of the natural image layer are to be outputted are arrayed. In this example, in the pixel position of a mask bit "1" the pixel values of the CG layer are selected, while in the pixel position of a mask bit "0", those of the natural image layer, and the selected pixel values constitute the output image.

[Image Processing Program]

Figure 7:
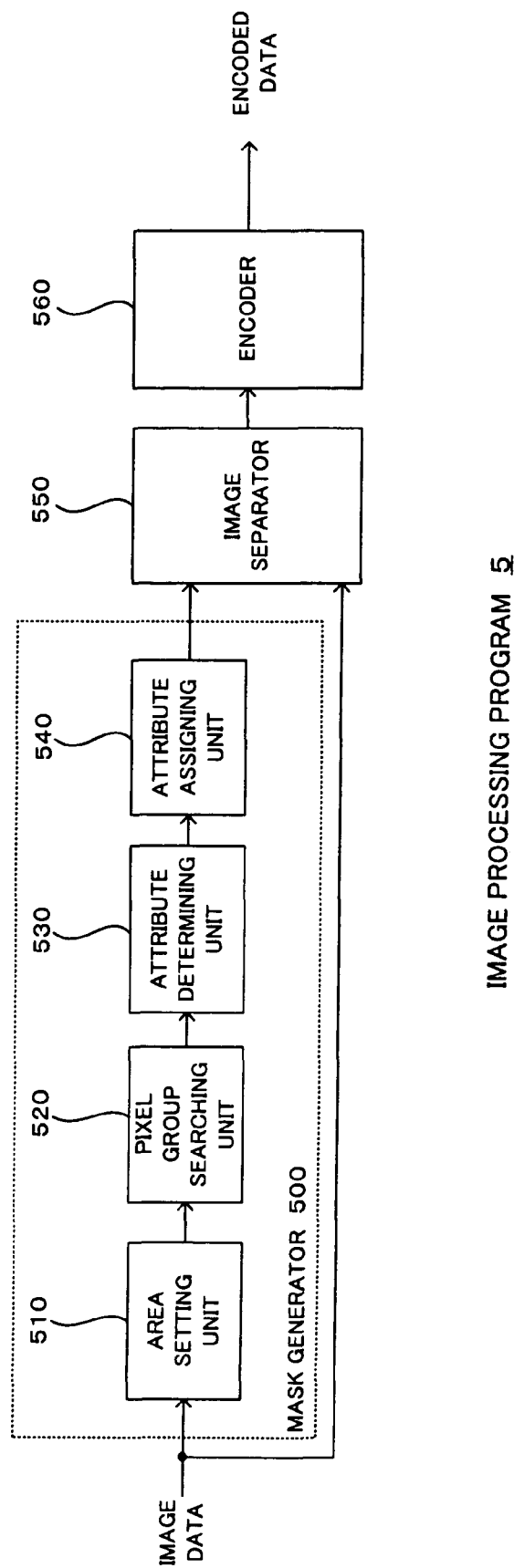
FIG. 7 illustrates the functional configuration of an image processing program 5 executed by the controller 20 (FIG. 5)

FIG. 7 illustrates the functional configuration of an image processing program 5 executed by the controller 20 (FIG. 5).

As illustrated in FIG. 7, the image processing program 5 has a mask generator 500 which generates the mask layer (FIG. 6), an image separator 550 which separates the input image into the CG layer and the natural image layer, and an encoder 560 which encodes the image data of each layer.

The mask generator 500 includes an area setting unit 510, a pixel group searching unit 520, an attribute determining unit 530, and an attribute assigning unit 540.

In the image processing program 5, the area setting unit 510 sets in the inputted image data a reference range (searching area) of a predetermined size.

More specifically, the area setting unit 510, in detecting a black pixel group of n or more consecutive rows or n or more consecutive columns, sets a reference range (window) of an (n+1)×(n+1) size when n is an even number or a reference range (window) of an n×n size when n is an odd number.

The area setting unit 510 in this example sets the window shown in FIG. 3A to detect a black pixel group of three or more consecutive rows or three or more consecutive columns.

The pixel group searching unit 520 searches for pixels having predetermined pixel values in the window set by the area setting unit 510. The predetermined pixel values are, for instance, pixel values other than that of the background color or the pixel value of the target pixel.

The pixel group searching unit 520 sets the central position in the window set by the area setting unit 510 at the target pixel, compares the pixel value of this target pixel with those of other pixels in this window, and searches for pixels having the same pixel value as the target pixel.

The attribute determining unit 530 determines the attributes of pixels contained in the window on the basis of at least either of the number and the arrangement of the pixels searched for by the pixel group searching unit 520.

The attribute determining unit 530 in this example judges whether or not there are three or more consecutive rows or three or more consecutive columns of pixels having the same pixel value as the target pixel in the window and, if there are, determines this target pixel to be a CG pixel (namely a pixel constituting a part of a CG image). For instance, attribute determination may use a look-up table in which the pattern of concurrence and non-concurrence among pixels in the window and the result of determination are matched with each other, or realize this by logical operation. In the case shown in FIG. 3D for instance, the concurrence pattern "(1, −1)=(concurrence), (−1, 1)=(concurrence)" and the "CG pixels" are matched with each other. Attribute determination may be based only on the number of pixels whose pixel values have been found concurrent with that of the target pixel. For instance, where the number of pixels whose pixel values are concurrent with that of the target pixel is not smaller than a threshold, the target pixel may be determined to be a CG pixel, or where it is smaller than the threshold, the target pixel may be determined to be a natural image pixel.

The attribute assigning unit 540 assigns the attribute determined by the attribute determining unit 530 to multiple pixels contained in the window.

The attribute assigning unit 540 in this example, if the attribute determining unit 530 determines the target pixel to be a CG pixel, assigns the attribute of being a CG pixel to this target pixel and pixels of the same pixel value consecutive from this target pixel. In this case, a mask bit "1" is assigned as the attribute of a CG pixel, and a mask bit "0" is assigned to other pixels.

Where the window size is 3×3, as the target pixel adjoins every other pixel, it is possible to decide whether or not to assign an attribute only on the basis of concurrence or non-concurrence of the pixel value, but where the window size is 4×4 or larger, as the target pixel does not always adjoin other pixels, whether or not there are consecutive pixels of the same pixel value as that of target pixel should also be taken into account in deciding whether or not to assign an attribute.

The image separator 550 splits the inputted image data on the basis of the attribute of each of the pixels inputted from the attribute assigning unit 540, and allocates the split image data to the CG layer and the natural image layer illustrated in FIG. 6B.

In this example, the mask bit assigned by the attribute assigning unit 540 constitutes the mask layer shown in FIG. 6B as it is. The CG layer is generated by AND operation of this mask layer and the input image, and the natural image layer is generated by subtracting the CG layer from the input image.

The encoder 560 encodes the CG layer, the mask layer and the natural image layer generated by the image separator 550 by the respectively corresponding encoding systems.

The encoder 560 in this example uses a lossless encoding system such as the LZ or run length encoding system when encoding the CG layer and the mask layer, and uses a lossy encoding system such as JPEG when encoding the natural image layer.

[Overall Operation]

Next, the overall operation of the image processing apparatus 2 (the image processing program 5) will be described.

Figure 8:
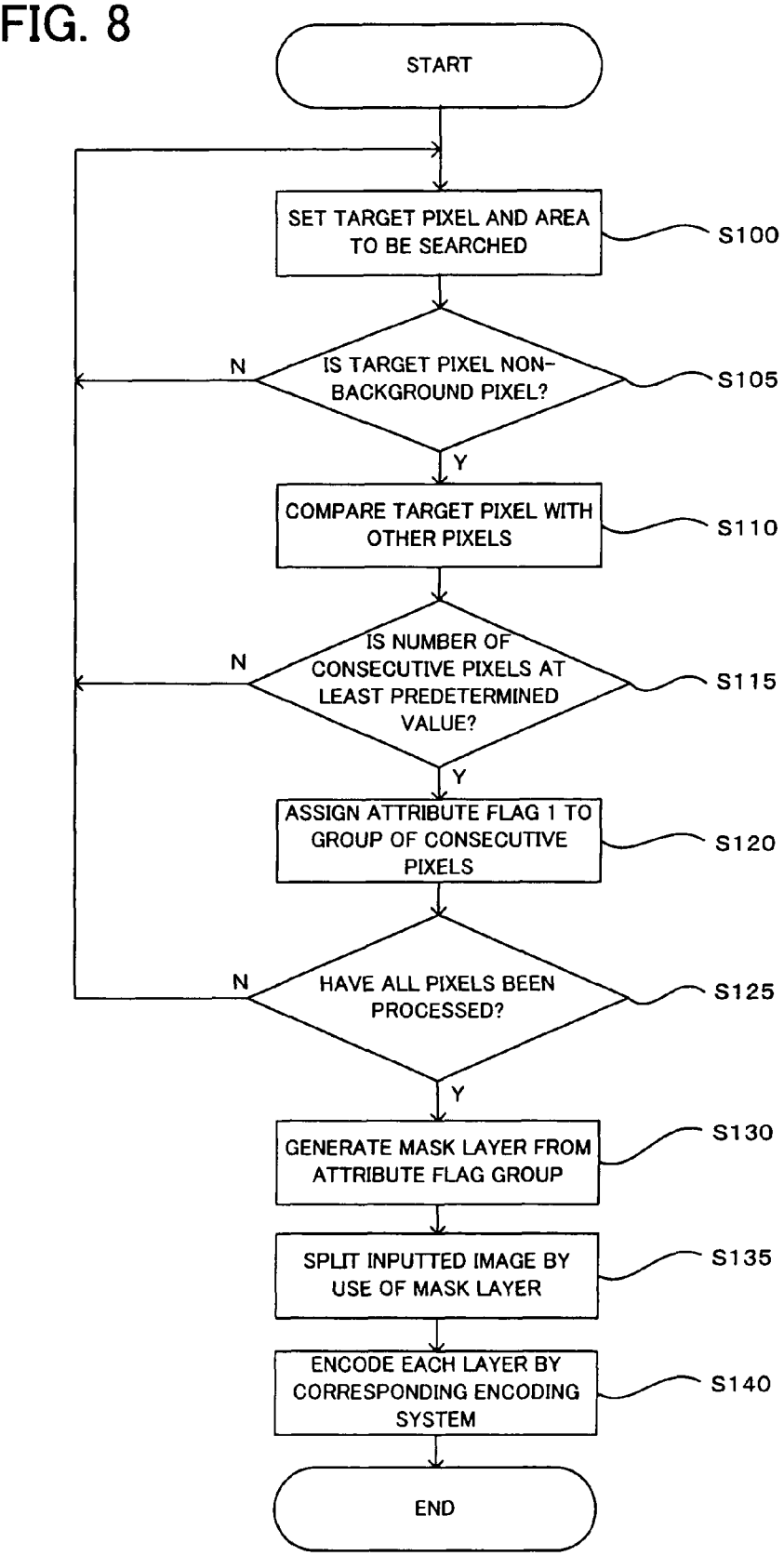
FIG. 8 is a flowchart of image processing (S10) by a first image processing program 5 (FIG. 7)

FIG. 8 is a flowchart of image processing (S10) by a first image processing program 5 (FIG. 7). Incidentally, this chart shows as a specific example a form in which image data of 256 shades are inputted and, if pixels of the same pixel value are consecutive for three or more rows or three or more columns, this group of pixel groups is determined to be part of a CG image.

As charted in FIG. 8, the area setting unit 510 (FIG. 7) sets at step 100 (S100) a window of 3×3 size (FIG. 3A) for the inputted image data in the sequence of scanning.

The pixel group searching unit 520 (FIG. 7) sets the target pixel (FIG. 3A) in the central position in the window set by the area setting unit 510.

At step 105 (S105), the pixel group searching unit 520 determines whether or not the target pixel is a non-background pixel (whose pixel value is 1 or greater).

If the target pixel is a non-background pixel (whose pixel value is any of 1 to 255), the image processing program 5 moves to the processing of S110 or, if the target pixel is a background pixel (whose pixel value is 0), returns to the processing of S100 to shift the positions of the window and of the target pixel by a one-pixel equivalent in the scanning direction.

At step 110 (S110), the pixel group searching unit 520 compares the pixel value of the target pixel with those of other pixels in this window to search the contents of the window for a pixel having the same pixel value as the target pixel.

At step 115 (S115), the attribute determining unit 530 determines, on the basis of the positions or number of the pixels searched for by the pixel group searching unit 520, whether or not there are three or more consecutive rows or three or more consecutive columns of pixels having the same pixel value as the target pixel in the window.

If there are three or more consecutive rows or three or more consecutive columns of pixels having the same pixel value as the target pixel in the window, the image processing program 5 moves to the processing of S120, or otherwise returns to the processing of S100 to shift the positions of the window and of the target pixel by a one-pixel equivalent in the scanning direction.

At step 120 (S120), the attribute assigning unit 540 assigns an attribute flag 1, which indicates that the pixel is a CG pixel, to the target pixel and each of the pixels having the same pixel value (in the same window) as this target pixel consecutive from it.

At step 125 (S125), the image processing program 5 judges whether or not all the pixels have been processed as target pixels and, if they have been, moves to the processing of S130 or, if there remain any unprocessed pixels, returns to the processing of S100 to shift the positions of the window and of the target pixel by a one-pixel equivalent in the scanning direction.

At step 130 (S130), the mask generator 500 generates the mask layer (FIGS. 6A and 6B) on the basis of the attribute flag 1 assigned by the attribute assigning unit 540, and outputs the generated mask layer to the image separator 550.

At step 135 (S135), the image separator 550, using the mask layer inputted from the mask generator 500, splits the inputted image data into the CG layer and the natural image layer, and outputs the image data of each layer to the encoder 560.

At step 140 (S140), the encoder 560 encodes the image data of each of the layers inputted from the image separator 550 by the respectively corresponding encoding systems.

As hitherto described, the image processing apparatus 2 of this exemplary embodiment determines whether or not each pixel is a CG pixel (the attribute of each pixel) and assigns an attribute of being a CG pixel to the pixel group containing the pixels having been determined as CG pixels.

This makes it possible, even where a CG image and a natural image coexist, to appropriately separate the CG image and the natural image from each other by pixel-by-pixel determination, and by assigning an attribute (of being a CG pixel) in pixel group units, to minimize the window size.

[Modification]

A modification of the foregoing exemplary embodiment will be described next.

Target pixels are set in the scanning sequence and each target pixel is compared with other pixels in the foregoing exemplary embodiment. However, considering symmetry, pixels already set as target pixels are already compared with pixels downstream in the scanning direction, and therefore part of comparative processing may be dispensed with when these downstream pixels have become target pixels.

Second Exemplary Embodiment

Next, a second exemplary embodiment of the invention will be described.

The foregoing description of the first exemplary embodiment referred to a form in which whether or not a given image is a CG image is determined as an attribute and the input image is split into a CG image and a natural image on the basis of the result of this determination. In this second exemplary embodiment, whether or not a given point is a non-isolated point is determined as an attribute, isolated points are removed on the basis of the result of this determination. Incidentally, an isolated point is a small point isolated in an input image and is to be removed as noise.

Figure 9:
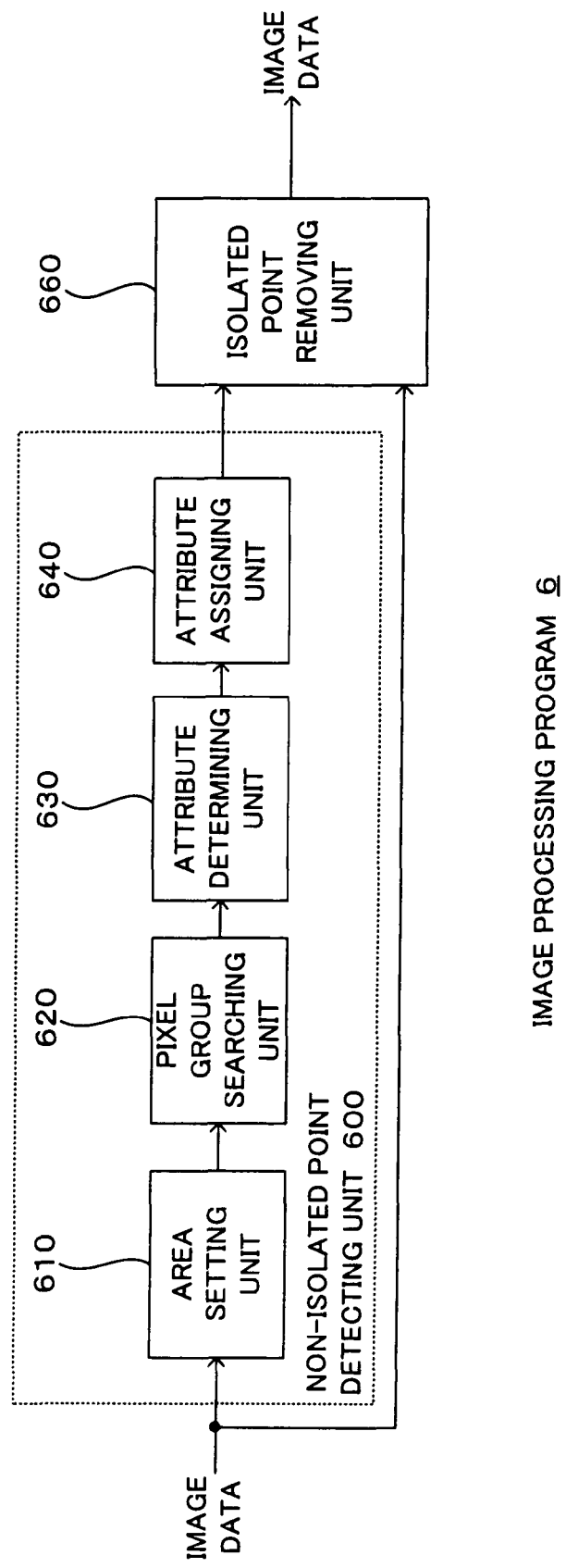
FIG. 9 illustrates the functional configuration of a second image processing program 6 executed by the controller 20 (FIG. 5)

FIG. 9 illustrates the functional configuration of a second image processing program 6 executed by the controller 20 (FIG. 5).

As illustrated in FIG. 9, the image processing program 6 includes a non-isolated point detector 600 which detects non-isolated points and an isolated point removing unit 660 which removes isolated points from the input image.

Further, the non-isolated point detector 600 includes an area setting unit 610, a pixel group searching unit 620, an attribute determining unit 630 and an attribute assigning unit 640.

In the image processing program 6, the area setting unit 610 sets, in the inputted image data, a reference range (searching area) matching the size of the isolated points to be removed.

In the area setting unit 610 of this example, when a non-background pixel group which is consecutive for n or more rows or n or more columns is to be detected as non-isolated points (namely, a pixel group of less than n in size is to be removed as isolated points), an (n+1)×(n+1) size reference range (window) is set when n is an even number or sets an n×n size reference range (window) when n is an odd number.

The pixel group searching unit 620 searches the window set by the area setting unit 610 for pixels of pixel values other than those of the background color.

Since a case in which a binary format image (black-and-white image) is inputted is described herein by way of specific example, the pixel group searching unit 620 here sets the central position in the window set by the area setting unit 610 as the target pixel and, when the pixel value of this target pixel is a black pixel (non-background color), compares the pixel value of this target pixel with the pixel value of other pixels in this window to search the contents of the window for a pixel having the same pixel value as the target pixel.

The attribute determining unit 630 determines the attributes of pixels contained in the window on the basis of at least either of the number and the arrangement of the pixels searched for by the pixel group searching unit 620.

The attribute determining unit 630 in this example judges whether or not there are n or more consecutive rows or n or more consecutive columns of pixels having the same pixel value as the target pixel (namely the black pixel) in the window and, if there are, determines this target pixel to be a non-isolated point pixel (namely a pixel constituting a part of a non-isolated point). Incidentally, the attribute determining unit 630 may also determine, if the target pixel is a black pixel (non-background color) and there are no n or more consecutive rows or n or more consecutive columns of black pixels, this target pixel to be an isolated point pixel (namely a pixel constituting a part of an isolated point).

The attribute assigning unit 640, when the attribute determining unit 630 determines the target pixel to be a non-isolated point pixel, assigns the attribute of being a non-isolated point pixel to this target pixel and pixels of the same pixel value consecutive from this target pixel. Incidentally, the attribute assigning unit 640 may also assign, when the attribute determining unit 630 determines the target pixel to be an isolated point pixel, the attribute of being an isolated point pixel to the target pixel and the black pixels consecutive from this target pixel.

The isolated point removing unit 660 removes isolated points from the inputted image data on the basis of the attribute of each pixel inputted from the attribute assigning unit 640.

The isolated point removing unit 660 in this example protects the groups of pixels to which the attribute of being non-isolated point pixels is assigned by the attribute assigning unit 640 by removing isolated points from pixels other than those in these groups of pixels. Incidentally, the isolated point removing unit 660 may also remove from the input image the groups of pixels to which the attribute of being isolated point pixels is assigned by the attribute assigning unit 640.

Figure 10:
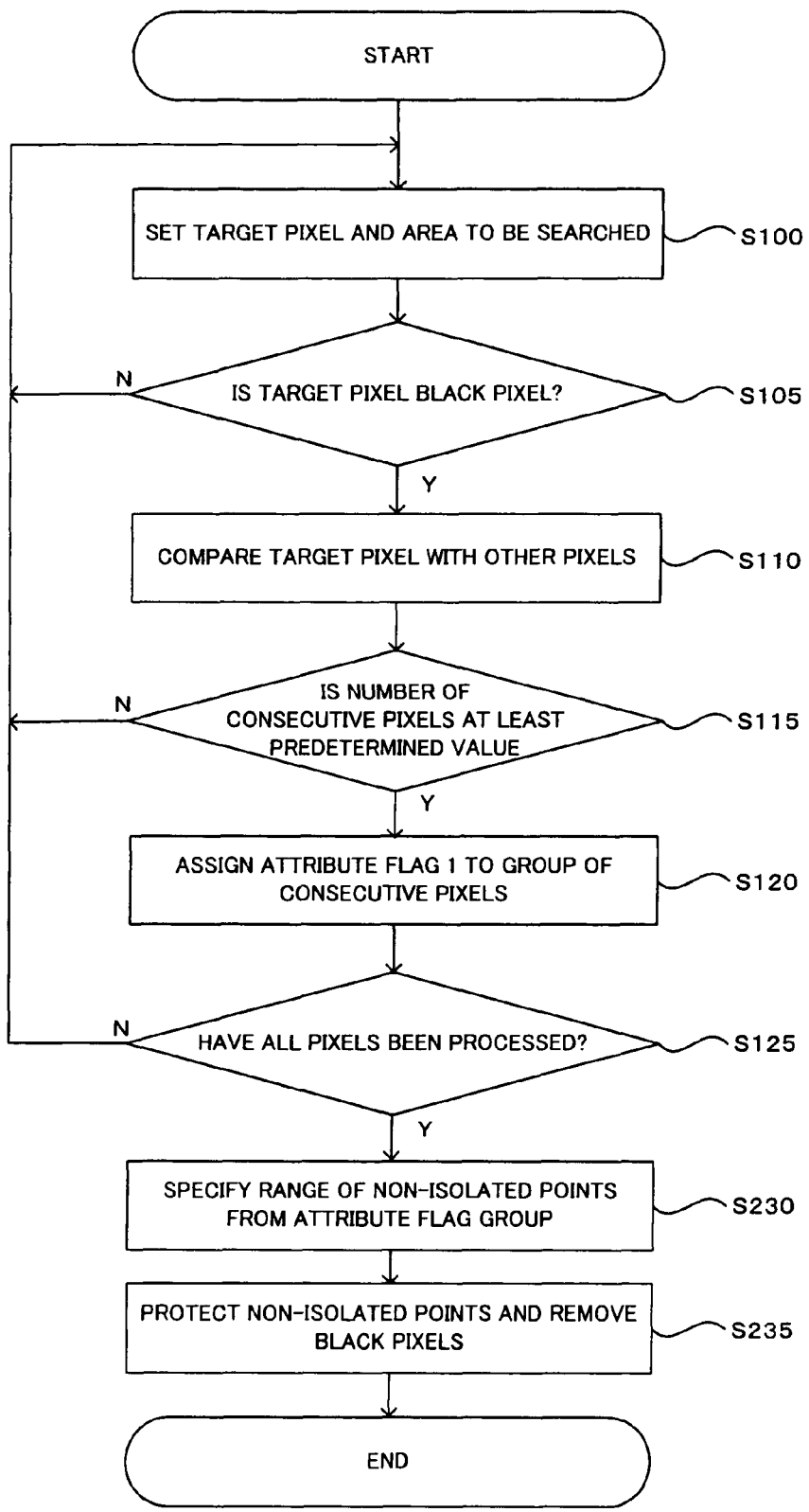
FIG. 10 is a flowchart of image processing (S20) by the second image processing program 6 (FIG. 9).

FIG. 10 is a flowchart of image processing (S20) by the second image processing program 6. (FIG. 9). Incidentally, in the form of processing chart here is a specific example of protecting, where there are three or more consecutive rows or three or more consecutive columns of pixels having the same pixel value as the target pixel, these groups of pixels as non-isolated point pixels. Of the steps of processing charted here, those substantially the same as their respective counterparts in FIG. 8 are assigned the same reference signs.

As charted in FIG. 10, at S100, the area setting unit 610 (FIG. 9) sets at step 100 (S100) a window of 3×3 size for the inputted image data in the sequence of scanning.

The pixel group searching unit 620 (FIG. 9) sets the target pixel (FIG. 3A) in the central position in the window set by the area setting unit 610.

At S105, the pixel group searching unit 620 determines whether or not the target pixel is a black pixel (non-background pixel). If the target pixel is a black pixel, the image processing program 6 moves to the processing of S110 or, if the target pixel is a white pixel (background pixel), returns to the processing of S100 to shift the positions of the window and of the target pixel by a one-pixel equivalent in the scanning direction.

At S110, the pixel group searching unit 620 compares the pixel value of the target pixel with those of other pixels in this window to search the contents of the window for a pixel having the same pixel value as the target pixel.

At S115, the attribute determining unit 630 determines, on the basis of the positions or number of the pixels searched for by the pixel group searching unit 620, whether or not there are three or more consecutive rows or three or more consecutive columns of pixels having the same pixel value as the target pixel in the window. The image processing program 6, if there are three or more consecutive rows or three or more consecutive columns of black pixel in the window, moves to the processing of S120, or otherwise, returns to the processing of S100 to shift the positions of the window and of the target pixel by a one-pixel equivalent in the scanning direction.

At S120, the attribute assigning unit 640 assigns an attribute flag 1, which indicates the pixel is a non-isolated point pixel, to the target pixel and each of the pixels having the same pixel value (in the same window) as this target pixel consecutive from it.

At S125, the image processing program 6 judges whether or not all the pixels have been processed as target pixels and, if they have been, moves to the processing of S230 or, if there remain any unprocessed pixels, returns to the processing of S100 to shift the positions of the window and of the target pixel by a one-pixel equivalent in the scanning direction.

At step 230 (S230), the non-isolated point detector 600 specifies the range of non-isolated points on the basis of the attribute flag 1 assigned by the attribute assigning unit 640, and outputs the specified range of non-isolated points to the isolated point removing unit 660.

At step 235 (S235), the isolated point removing unit 660 removes isolated points from the inputted image data protecting the range of non-isolated points inputted from the non-isolated point detector 600. More specifically, the isolated point removing unit 660 removes black pixels outside the range of non-isolated points as isolated points.

As hitherto described, the image processing apparatus 2 of this exemplary embodiment determines whether or not each pixel is a non-isolated point pixel (the attribute), and assigns the attribute of being non-isolated points to the group of pixels including the pixels determined to be non-isolated point pixels.

This makes it possible, even where non-isolated points and isolated points coexist, to appropriately separate the non-isolated points and the isolated points from each other by pixel-by-pixel determination, and by assigning an attribute (of being a non-isolated point) in pixel group units, to minimize the window size.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus, comprising:
an area setting section that sets a searching area of a predetermined size in inputted image data;
a searching section that searches for pixels having a predetermined pixel value in the searching area set by the area setting section;
an attribute determining section that determines attribute of pixels contained in the searching area on the basis of at least either of a number and an arrangement of the pixels searched for by the searching section; and
an attribute assigning section that assigns the attribute determined by the attribute determining section to the searched pixels,
wherein the sections are a controller implemented software.

2. The image processing apparatus according to claim 1,
wherein the searching section compares a pixel value of a target pixel in a predetermined position in the searching area with pixel values of other pixels in the same searching area;
the attribute determining section determines, on the basis of an arrangement or a number of other pixels having the same pixel value as the target pixel, whether or not the target pixel is part of an optically picked-up image or part of a computer-generated image; and
the attribute assigning section assigns, if the target pixel is determined to be part of a computer-generated image, to the target pixel and at least some of the other pixels having the same pixel value as the target pixel, an attribute indicating that the pixels are part of a computer-generated image, and the apparatus further comprising:
an image separating section that separates inputted image data into a plurality of image elements on the basis of the attribute assigned by the attribute assigning section.

3. The image processing apparatus according to claim 2,
wherein the attribute determining section determines, if a group of pixels having the same pixel value as the target pixel is greater than or equal to a standard size which is an even number, the target pixel to be part of a computer-generated image;
the attribute determining section determines, if a group of pixels having the same pixel value as the target pixel is the same size as a standard size which is an odd number, the target pixel to be part of computer-generated image;
the area setting section sets, if the standard size is an even number, a searching area greater than the standard size by a one-pixel equivalent; and
the area setting section sets, if the standard size is an odd number, a searching area of the same size as the standard size.

4. The image processing apparatus according to claim 1,
wherein the attribute determining section determines, on the basis of a result of searching by the searching section, a group of pixels contained in the searching area to be non-isolated points if pixels having a predetermined pixel value are arrayed in a predetermined number or more in a predetermined direction; and the attribute assigning section assigns, to the pixels of the predetermined pixel value contained in the searching area, an attribute indicating that the pixels are non-isolated points if the attribute determining section determines the pixels to be non-isolated points; and the apparatus further comprising:

an isolated point removing section that removes, from the inputted image data, isolated points of or smaller than a predetermined size on the basis of the attribute assigned by the attribute assigning section.

5. The image processing apparatus according to claim 4, wherein the attribute determining section determines, if a group of pixels having the same pixel value as the target pixel is greater than or equal to a standard size which is even number, the target pixel to be part of a computer-generated image;

the attribute determining section determines, if a group of pixels having the same pixel value as the target pixel is the same size as a standard size which is an odd number, the target pixel to be part of computer-generated image;

the area setting section sets, if the standard size is an even number, a searching area greater than the standard size by a one-pixel equivalent; and the area setting section sets, if the standard size is an odd number, a searching area of the same size as the standard size.

6. The image processing apparatus according to claim 1, wherein the searching section compares, if the target pixel in a predetermined position in the searching area has a predetermined pixel value, the target pixel with other pixels in the same searching area to search for pixels having the same pixel value as the target pixel;

the attribute determining section determines an attribute of the target pixel on the basis of at least one of a number and an arrangement of the pixels searched for by the searching section; and the attribute assigning section assigns the attribute of the target pixel determined by the attribute determining section to the other pixels in the same searching area.

7. The image processing apparatus according to claim 6, wherein the area setting section sets a searching area in which an odd number of pixels are arranged respectively in a horizontal direction and a vertical direction; and the searching section specifies as the target pixel the pixel at the center of the set searching area.

8. The image processing apparatus according to claim 6, wherein the attribute assigning section assigns the attribute of the target pixel determined by the attribute determining section to a group of pixels of the same search area in a range in which the same pixel value is consecutive starting with the target pixel.

9. An image processing method employing a controller implemented software, comprising:

setting, by the controller implemented software, of a searching area of a predetermined size in inputted image data;

searching, by the controller implemented software, for pixels having a predetermined pixel value in the set searching area;

determining, by the controller implemented software, attribute of pixels contained in the searching area on the basis of at least one of a number and an arrangement of the pixels searched for; and assigning, by the controller implemented software, the determined attribute to the searched pixel.

10. A non-transitory computer readable medium storing a program causing a computer to execute a process comprising:

setting of a searching area of a predetermined size in inputted image data;

searching for pixels having a predetermined pixel value in the set searching area;

determining attribute of pixels contained in the searching area on the basis of at least one of a number and an arrangement of the pixels searched for; and assigning the determined attribute to the searched pixel.

* * * * *